Figures 1, 2, 3:
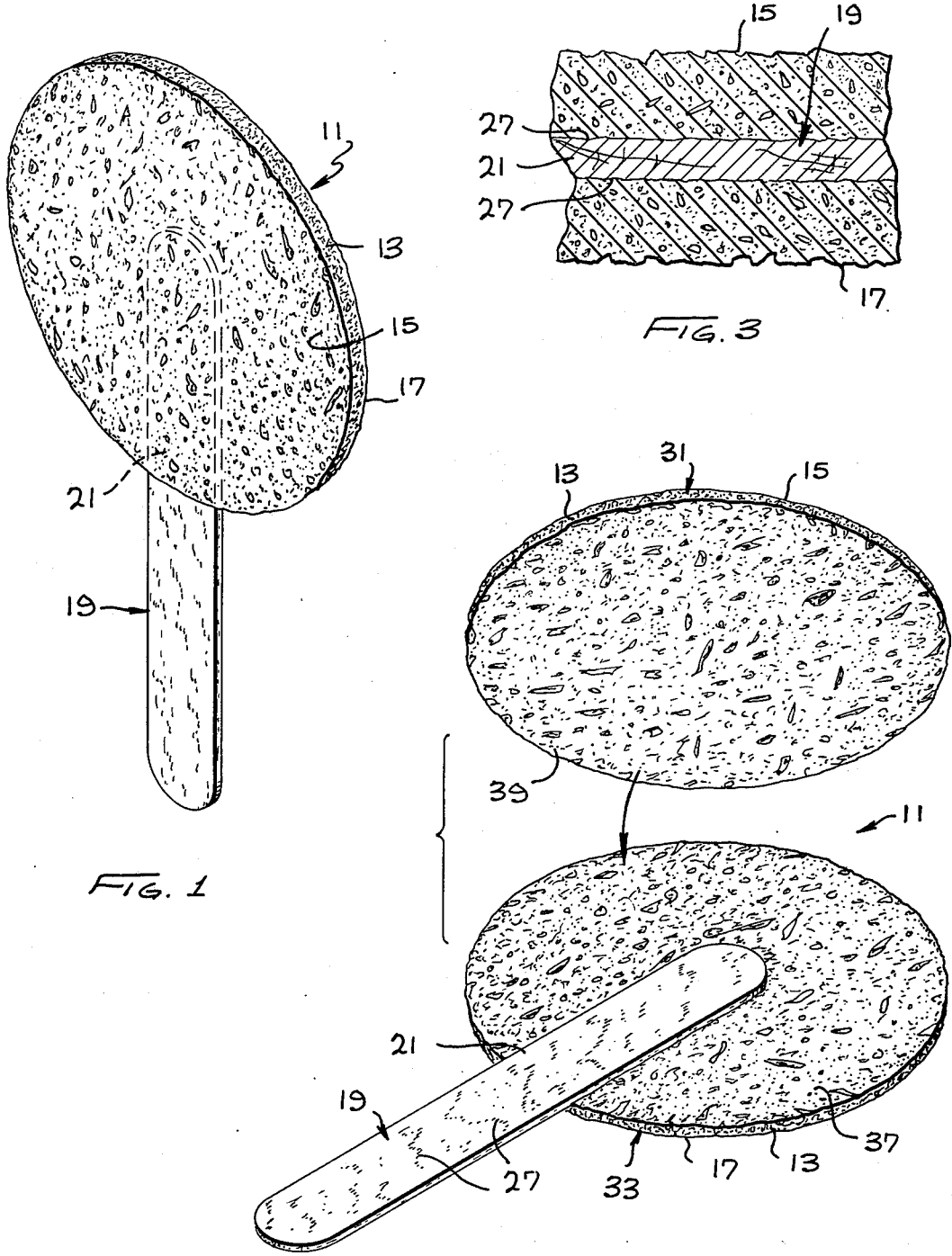

United States Patent [19]

Stephenson

[11] 4,139,644

[45] Feb. 13, 1979

[54] METHOD OF BAKING AND PRODUCT THEREOF

[76] Inventor: Edward S. Stephenson, 3129 Durand Dr., Hollywood, Calif. 90028

[21] Appl. No.: 859,339

[22] Filed: Dec. 12, 1977

[51] Int. Cl.² ............................................. A23L 1/01
[52] U.S. Cl. .................................. 426/134; 426/421; 426/496; 426/523
[58] Field of Search ............... 426/134, 91, 421, 110, 426/94, 104, 275, 496, 502, 523, 505, 500, 501; D1/22, 23, 24, 15-20, 99

[56] References Cited

U.S. PATENT DOCUMENTS

| | | | |
|---|---|---|---|
| D. 70,559 | 7/1926 | Hochstadter | D1/22 |
| 1,706,491 | 3/1929 | Jenkins | 426/305 X |
| 1,915,614 | 6/1933 | Parker | 426/134 X |
| 1,929,906 | 10/1933 | Skokowski | 426/421 |
| 2,469,589 | 5/1949 | Barricini | 426/104 |
| 2,950,200 | 8/1960 | Jongs et al. | 426/134 |
| 2,968,567 | 1/1961 | Hooker | 426/134 X |
| 3,656,968 | 4/1972 | Allen | 426/275 |
| 3,782,966 | 1/1974 | Forkner | 426/275 |
| 3,804,956 | 4/1974 | Bongiovanni | 426/134 X |
| 4,027,047 | 5/1977 | Harima | 426/421 |

FOREIGN PATENT DOCUMENTS

| | | | |
|---|---|---|---|
| 680486 | 2/1964 | Canada | 426/134 |
| 2099014 | 3/1972 | France | 426/91 |
| 45-35223 | 11/1970 | Japan | 426/134 |

*Primary Examiner*—Steven L. Weinstein

[57] ABSTRACT

A bakery product comprising a cookie fixedly connected to a stick by means of which the cookie may be held by a consumer.

5 Claims, 3 Drawing Figures

U.S. Patent  Feb. 13, 1979  4,139,644

METHOD OF BAKING AND PRODUCT THEREOF

The present invention relates to a bakery product and its method of production. More specifically, the invention relates to a bakery product such as a cookie which may be produced with a stick contained therein and extending therefrom by means of which the consumer may hold the cookie while he is eating it.

In the past, cookies have always been baked in such a manner that the consumer had to pick up the object with his fingers and hold it in his hand as he was eating it. In many instances, this is undesirable because dirt or bacteria on the hands of the consumer may cause illness and/or destroy the taste of the cookie. Further, such cookies often soil the hands, e.g., when small confection chips melt as a result of contact with the normal heat of the consumer's hands.

While several attempts have been made to obviate these two major disadvantages, all have been relatively expensive and disadvantageous in that they require individual wrapping of each cookie, etc. Accordingly, it has long been desired to provide some means by which the consumer could pick up and eat a cookie without having to handle it, thereby obviating the prior art disadvantages of either contaminating the cookie or soiling his hands.

As stated previously, the present invention relates to the structure of a bakery product which does not have to be touched by the consumer while he eats it, as well as to the method of producing such a product. In the exemplary embodiment disclosed in this application, such a product may comprise a body of dough which is baked in a well known manner, such as by placing it into a heated oven. In this embodiment, a stick which may, if desired, resemble a tongue depressor may be inserted into a cookie so as to extend beyond the periphery of the cookie a distance sufficient to allow a consumer to grasp the stick with his hand. Preferably, the stick may extend far enough into the cookie dough so that there can be a relatively large line of contact between the edge of the stick and the cookie. This may minimize the possibility that the weight of the baked dough is so large as to break the cookie along the edge of the stick.

It has been found that one preferred method of producing such a cookie is to form two separate patties of unbaked dough. The stick may be placed in face-to-face contact with one of the patties and the other patty pressed firmly in place so that the stick is sandwiched between the adjacent faces of the patties while extending beyond the periphery thereof. In this preferred construction, it has been found desirable to provide that the stick or handle be produced from a cellulose structure, such as wood. Wood, in the exemplary embodiment, is a rather porous material which can be easily wetted, in the chemical sense, by moisture in the unbaked dough. It has been found that such wetting is desirable to improve the rigidity and integrity of the finished product. Since wood is a porous structure and wetting causes it to expand slightly, as the product is heated and the dough baked, it is believed that the dough will expand to tightly grip the wood stick, as well as to extend into the porous surfaces of the wood and thus tightly retain the wood within the dough. Consequently, when a consumer picks up the stick, the cookie will remain attached regardless of the position in which it is held.

In producing such cookies by hand, it has been found to be very expedient to form two relatively thin dough patties having the general shape of a cookie to be produced. The stick may then be placed against one face of a patty and the second patty placed on the opposite side of the stick and gently pressed against the stick and the first patty. This action will cause a wetting of that portion of the stick between the patties and it has been found that such wetting aids in retention of the stick within the finished product. Although it is not certain, it is possible that this wetting process may cause a very slight chemical reaction between the certain doughs and the wood, generating a stickiness which further improves the ability of those doughs to fix itself to the wood. Also, the wetting causes a slight, temporary expansion of the wood. This may allow dough to become more firmly embedded in the pores and cracks of the wood and thus to be more firmly gripped as the wood shrinks during baking.

After the product has been assembled in this manner, it may be inserted into an oven and baked in the well known process used for baking cookies. Consequently, by utilizing this invention, a food product can be produced which need not be touched by anyone after it is initially formed prior to baking. Although the present invention is described and illustrated in an exemplary embodiment, those skilled in the art will realize that it may also be employed in a wide variety of related products using different components and different methods of production. Even though such alternatives do not resemble the embodiments described here, but they will nevertheless employ the invention as set forth in the appended claims.

The accompanying drawings are provided for the purposes of illustration and not limitation.

In the drawings there is illustrated:

FIG. 1 comprises of isometric illustration of a cookie formed in accordance of the present invention;

FIG. 2 comprises an isometric view of unbaked cookie in accordance with the preferred method of production of such a cookie; and FIG. 3 comprises an enlarged, broken away view of a cookie with a holding stick embedded therein.

As shown in FIG. 1, a cookie 11 may be provided to have a circular or any other desired configuration with a periphery 13, an upper face 15 and a lower face 17 (as shown in FIG. 3). There is illustrated as extending from the cookie a stick 19 which may, if desired, be of sufficient length to be easily carried in the hand of the consumer. The stick preferably includes a portion 21 thereof which extends into the cookie a distance equal to the radius of the body of the cookie, and preferably somewhat further.

With this total product, the consumer can pick up the cookie by grasping the handle 19 and bring the cookie to his mouth in order to take a bite. Thus, he need not handle the cookie itself and he is thereby protected from any contaminants or dirt on his hand. The consumer is also protected from soiling his hands by any of the materials used to make the cookie, such as chocolate chips which may melt on contact with his fingers.

Preferably, the stick 19 may be manufactured from a cellulose material such as wood which is relatively porous. Thus, as illustrated in the enlarged cross section shown in FIG. 3, as the dough is baked and dried it will expand during the baking process so that it fills in the small pores, cracks, etc., 27 on the opposite sides and edges of the stick. Consequently, the dough will grip the stick in those areas and adhere to it to an extent that the stick cannot be easily removed from the cookie without breaking the latter.

It is possible that a number of methods of manufacturing of the cookie may be employed at various times, but a manual process which is most preferred at the present time comprises forming a plurality of patties 31 and 33 as shown in FIG. 2. The stick 19 may then be placed on the face 37 of one of the patties so that it extends beyond the periphery 13 thereof. The other patty 31 may then be positioned over the stick and first patty 33 so that a face 39 thereof may be tightly pressed against face 33 and the portion 21 of the stick 19.

As a result, these sandwiched work pieces will be held together during and after the baking process. Although the above-described process has proven to be more satisfactory than attempting to force a stick into a single patty of dough, it is quite possible that this latter method could be employed, particularly on an automatic, mass production basis.

In any event, when portion 21 of the stick 19 comes into contact with dough on either side thereof, the stick will become wetted, in the chemical sense, by adsorption of moisture from the dough. Such adsorption will cause the stick to expand very slightly, and especially will cause the porous surface of the section 21 of the stick to expand beyond its dry state and thus enlarge the pores, cracks, etc., into which the batter will expand as it is baked.

As the cookie is baked, the expansion of the batter during the heating process will cause miniscule parts of the batter to expand into the pores at the same time that the remainder of the batter is exerting a uniform compressing force on the section 21 of the stick. Thus, as the batter expands and the wood contracts during the baking process, the dough will become fixed to the stick. Further, it is also possible that, in the case of some batter mixes, a slight chemical reaction may occur with the wood, increasing the "stickiness" between the batter and the wood to hold the cookie in place.

Accordingly, the novel product formed in accordance with method of this invention, as claimed in the following claims, result in a cookie which has heretofore been unavailable for commercial consumption. Of course, those skilled in the art will realize that other structures and methods, even though they may not employ that preferred embodiment illustrated and described here, are nevertheless readily available without exceeding the scope of the invention as set forth in the following claims.

What is claimed is:

1. The method of preparing an edible cookie item comprising the steps of
    positioning a porous wettable holding stick within the center of a moist cookie dough preparation such that the stick extends outwardly beyond the extremity thereof,
    allowing the dough to wet the stick, and
    baking the preparation at a temperature sufficient to bake the dough preparation to an edible condition and to fix the baked dough preparation to the surface of the stick; such that the stick comes into contact with and thus becomes wetted by adsorption of moisture from the dough and expands very slightly, thus enlarging the pores into which the dough expands as it is baked at the same time the dough presses against the stick, thus fixing the dough to the stick.

2. A baked cookie product produced by the process of claim 1.

3. The method of producing an edible cookie item comprising the steps of
    placing a porous wettable wooden stick on a first unbaked moist cookie dough product such that the stick is in contact with and wetted by the face of the first product and extends outwardly beyond an edge of the first product face,
    placing a second unbaked moist cookie dough product upon the first product such that the stick is in contact with and wetted by the face of the second product and extends outwardly beyond an edge of the second product face,
    pressing the first and second products together, and
    baking the first and second products with the stick therebetween at a temperature sufficient to convert the dough of the product to an edible baked cookie form and to fix the surface of the stick to the baked cookie; such that the stick comes into contact with and thus becomes wetted by adsorption of moisture from the dough and expands very slightly, thus enlarging the pores into which the dough expands as it is baked at the same time the dough presses against the stick, thus fixing the dough to the stick.

4. The method of preparing a baked cookie product comprising the steps of
    providing a pair of unbaked patties of moist cookie batter ready for baking,
    assembling the patties in face-to-face relationship with a hand-grippable porous wettable wooden stick therebetween and extending radially outwardly therefrom,
    allowing the moist cookie dough to wet the stick, and
    baking the assembly, thereby
    causing the patties to become joined to one another and fixed to the surface portions of the stick therebetween; such that the stick comes into contact with and thus becomes wetted by adsorption of moisture from the dough and expands very slightly, thus enlarging the pores into which the dough expands as it is baked at the same time the dough presses against the stick, thus fixing the dough to the stick.

5. The method for preparing a baked cookie product comprising the steps of
    providing a batch of moistened cookie dough,
    placing a handle-stick having a porous wettable surface within the batch of dough, thereby
    wetting the surface of the stick in its area of contact with the dough, and
    baking the dough at a temperature sufficient to convert the dough into an edible cookie and to fix the dough to the surface of the handle-stick; such that the stick comes into contact with and thus becomes wetted by adsorption of moisture from the dough and expands very slightly, thus enlarging the pores into which the dough expands as it is baked at the same time the dough presses against the stick, thus fixing the dough to the stick.

* * * * *